Aug. 1, 1950 T. E. McFALL 2,517,225
PISTON RING
Filed July 14, 1947 4 Sheets-Sheet 1
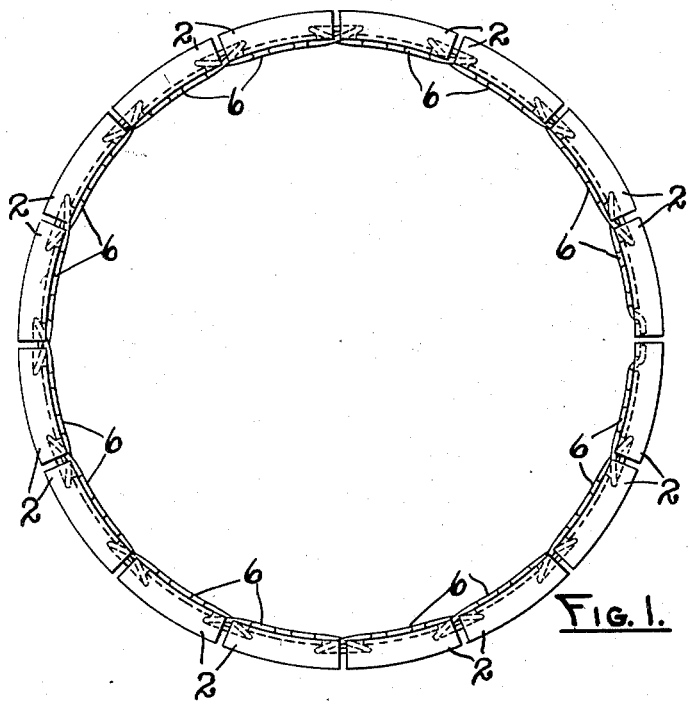
INVENTOR
THURLOW E. McFALL
BY Liverance and
Van Antwerp
ATTORNEYS

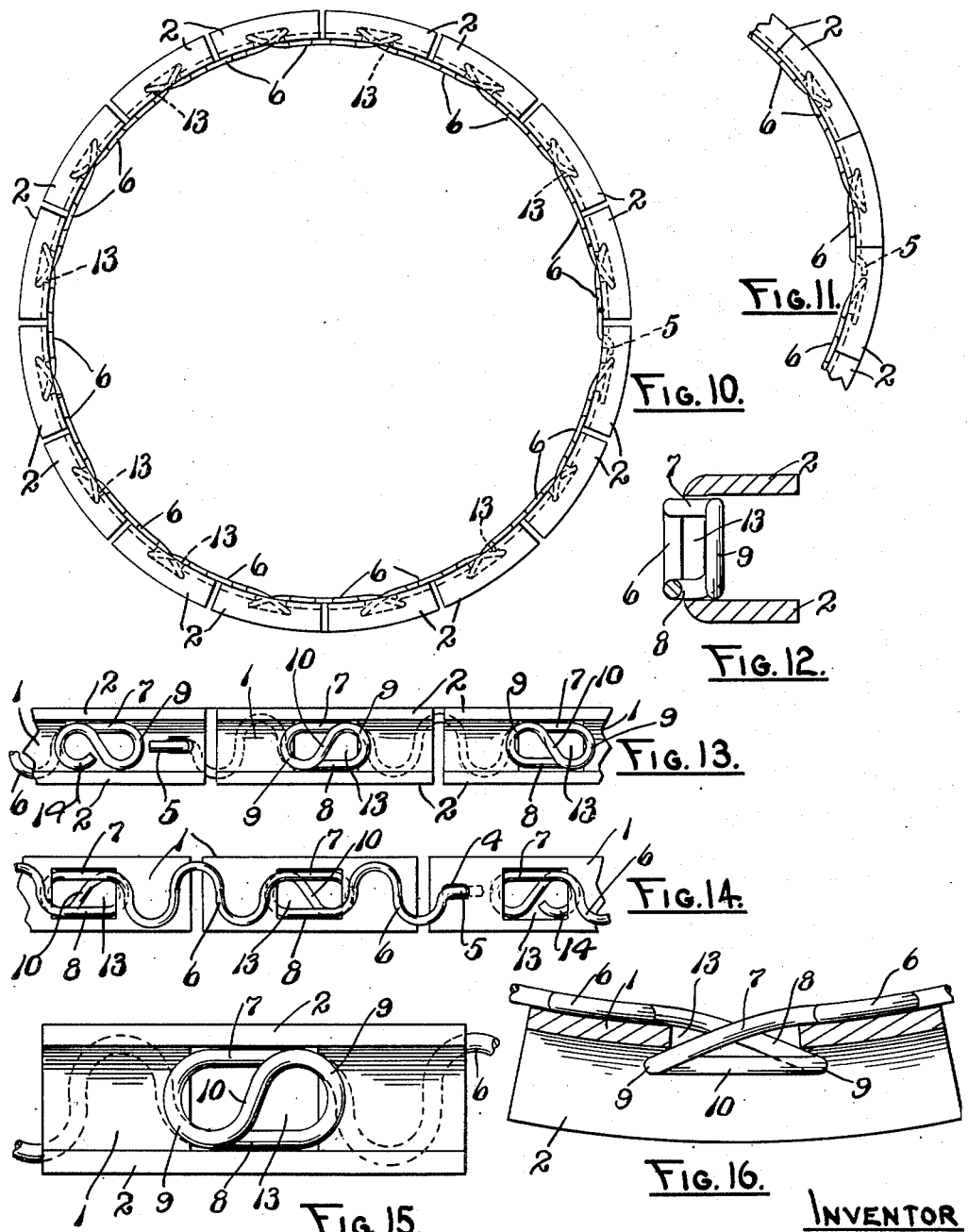

Aug. 1, 1950     T. E. McFALL     2,517,225
PISTON RING
Filed July 14, 1947     4 Sheets-Sheet 3
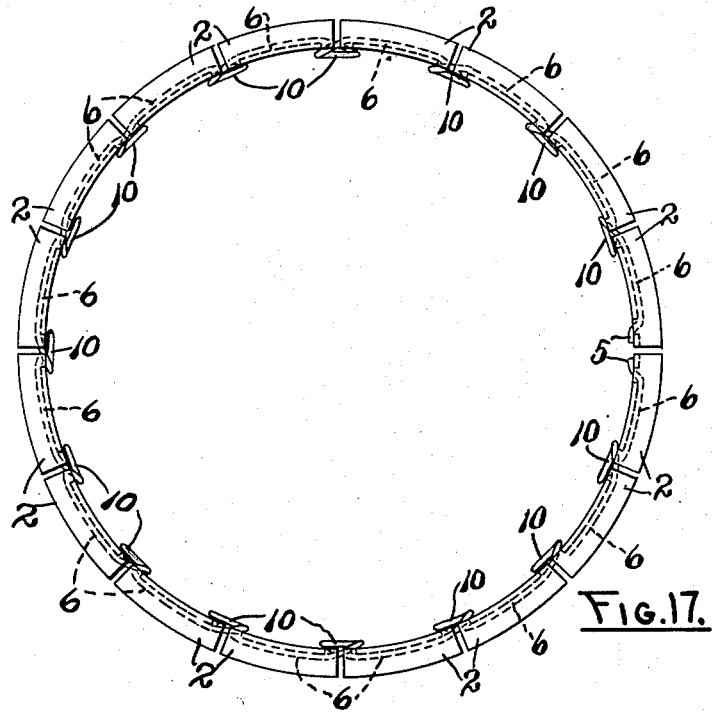
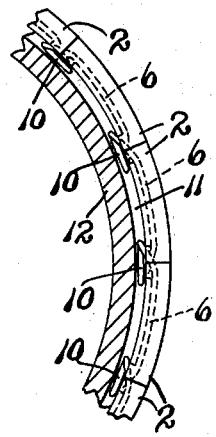
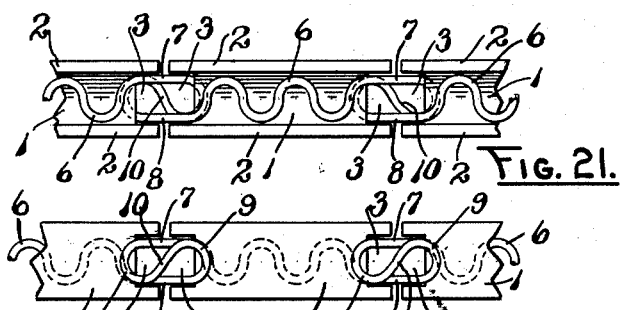
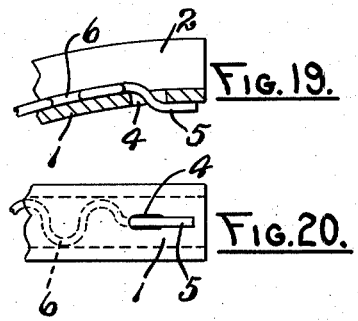
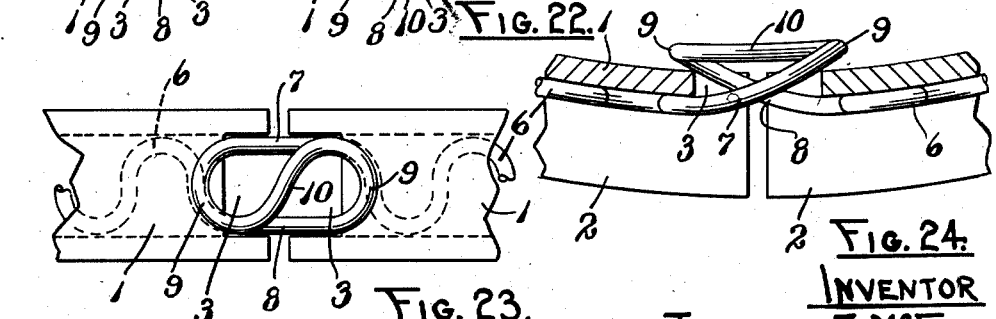
INVENTOR
THURLOW E. McFALL
BY Liveramer and
Van Antwerp
ATTORNEYS

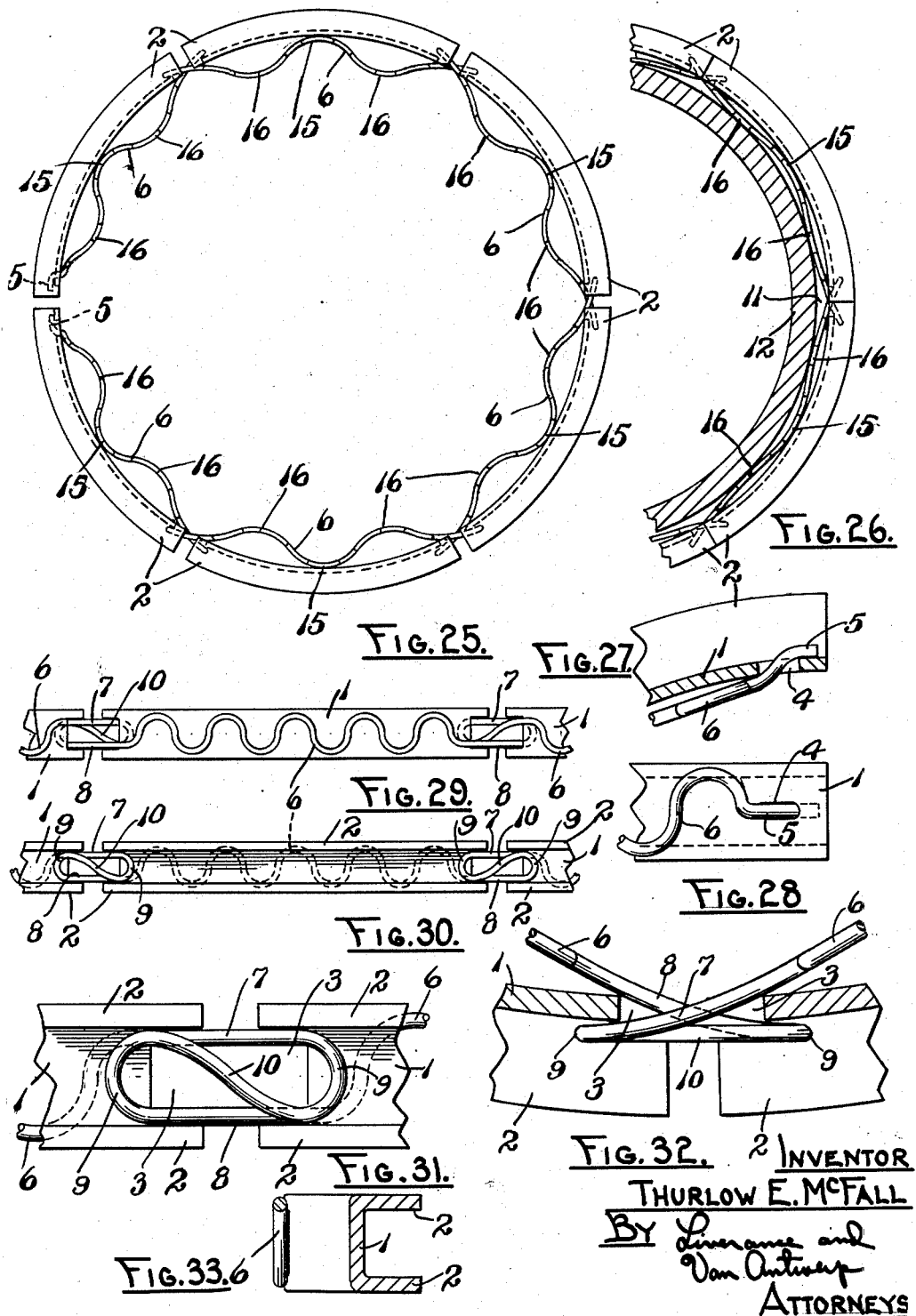

Patented Aug. 1, 1950

2,517,225

UNITED STATES PATENT OFFICE 2,517,225

PISTON RING

Thurlow E. McFall, Sparta, Mich., assignor to Muskegon Piston Ring Company, Muskegon, Mich., a corporation of Michigan Application July 14, 1947, Serial No. 760,744

4 Claims. (Cl. 309—45)

This invention is concerned with piston rings which are, in general, designed for use in the lower grooves of pistons in internal combustion engines. It is an object and purpose of the present invention to provide a novel structure of piston ring with a plurality of arc-shaped sections, which are to be located end to end to make a complete circular ring when the adjacent ends of the sections are substantially together, and to supply said ring sections with connected yielding pressure means, which acts, when the ring is contracted within a cylinder, to yieldingly press said ring sections against the cylinder wall to seal against undesired passage downward of high temperature gases of combustion from the combustion chamber above the piston in the engine, and conserve lubricating oil by a scraping removal and collection of excess oil from the walls of the cylinder to pass through the ring to its piston ring groove, and thence through passages in the piston to the interior thereof, and back to the engine crankcase.

In the present invention, which is illustrated in a number of embodiments in the drawings, the ring in a normally free expanded condition has the several segments separated a distance at adjacent ends, but is contracted and compressed into a ring of less diameter in service. The ring sections are all connected securely to a single spring tension member of circular outline, and which upon the contraction of the ring is strained from its normal free condition, with a development of force or tension in the spring which tends to press the ring sections against the cylinder wall and hold them thereagainst with the necessary pressure for scraping and removing excess lubricating oil.

With my invention, ring sections, preferably of thin steel and in channel form, are economically produced, and the spring member on which they are mounted and assembled is of a spring steel wire rod, which may be quickly and economically fabricated by large quantity production methods. The assembly of the parts is readily done, and a practical and very serviceable ring at low cost, for the purposes stated, is obtained.

An understanding of the invention may be had from the following description, taken in connection with the accompanying drawings, in which:

Fig. 1 is a plan view of one form of the piston ring made in accordance with my invention, showing it with the ring sections separated at their ends as they are when free and unrestrained.

Fig. 2 is a fragmentary plan and partial section showing the ring located in a ring receiving groove of a piston, with the sections at their ends substantially in contact, Fig. 3 is a somewhat enlarged transverse vertical section through the ring at one side thereof, Fig. 4 is a fragmentary elevation from the inner side of the ring, showing the expanding spring member and the manner of connecting the ring sections therewith, Fig. 5 is a similar elevation from the outer side of the ring.

Fig. 6 is a further enlarged fragmentary section of end portions of two ring sections at their adjacent ends, and the connecting structure of the expanding spring member associated therewith at said ends of the sections, Fig. 7 is a fragmentary elevation from the outside of the ring, of one of the end sections, of which there are two, one at each side of an open parting in the ring, illustrating the manner of anchoring the ends of the expanding spring member, Fig. 8 is a plan view thereof, Fig. 9 is a fragmentary horizontal longitudinal section through the structure shown in Fig. 6, between the upper and lower sides thereof, Fig. 10 is a plan similar to Fig. 1, illustrating a modification of structure in the manner in which the ring sections are connected to the expander spring member with the ring sections spaced at their ends, Fig. 11 is a fragmentary plan of the ring in its contracted, service condition, Fig. 12 is an enlarged, vertical, transverse section through a side thereof, Fig. 13 is a fragmentary elevation at the outer side of the ring, similar to Fig. 5.

Fig. 14 is a fragmentary elevation from the inner side of the ring, similar to Fig. 4.

Fig. 15 is an enlarged elevation from the outer side of the ring of one of the ring sections, showing its connection to the expander springs, Fig. 16 is a longitudinal horizontal section therethrough between its upper and lower sides, Fig. 17 is a plan, similar to Figs. 1 and 10, of a further modification of the ring wherein a reversal of the expander spring member with respect to the ring sections is shown, Fig. 18 is a fragmentary plan and section similar to Fig. 2, showing the ring in its contracted condition when in service with a piston in a ring groove, Figs. 19 and 20 are a fragmentary longitudinal horizontal section and an inner side elevation of one of the sections of the ring at its open parting, illustrating the anchoring of the ends of the spring expander member on said end sections, Figs. 21 and 22 are, respectively, an outer elevation and an inner elevation of the ring structure shown in Fig. 17, Fig. 23 is a fragmentary enlarged outer elevation of the end portions of two successive ring sections, and their connection with the expander spring member, Fig. 24 is a longitudinal horizontal section therethrough between opposite upper and lower sides, Fig. 25 is a plan of a further modification in structure wherein the ring has a less number of sections and the spring expander of Fig. 1 is alternately inwardly and outwardly bowed at the inner side of and between the ends of the sections, said ring being shown in its uncontracted condition.

Fig. 26 is a fragmentary plan and horizontal section of the ring in service in the ring groove of a piston, Figs. 27 and 28 are, respectively, a fragmentary longitudinal horizontal section and an inner elevation of an end portion of one of the two end sections of the ring at the open parting therein, showing the anchor connection of the expanding spring member therewith, Figs. 29 and 30 are, respectively, a fragmentary inner elevation and a fragmentary outer elevation of the ring shown in Fig. 25.

Fig. 31 is an enlarged fragmentary outer elevation of the adjacent end portions of two ring sections at their adjacent ends and the connection thereof to the spring member, Fig. 32 is a longitudinal horizontal section through the structure in Fig. 1, between its upper and lower sides, and Fig. 33 is a transverse vertical section through the ring of Fig. 25 at a side thereof.

Like reference characters refer to like parts in the different figures of the drawings.

In the construction shown in all of the embodied forms of the invention, a plurality of arc-shaped ring sections are used with each ring, the number of which may be varied. The ring sections, when placed successively in end to end engagement, make a circular ring which may be received within and bear against the cylinder wall of an internal combustion engine.

Each of the ring sections is preferably made from sheet metal, having a vertical web 1 and upper and lower outwardly extending flanges 2, the free outer edges of which are adapted to bear against a cylinder wall. Each of the ring sections in the form shown in Figs. 1 to 9 inclusive, except the two end sections which are one at each side of an open parting in the ring, at each end is formed with a rectangular shaped notch or recess 3, by cutting away a part of the web 1, leaving projecting portions of the flanges 2 which extend in adjacent sections toward each other. When the ends of the flanges are brought together, the two notches or recesses 3 form a rectangular opening. Each of the end sections at the parting, at their adjacent ends, has an opening 4 through its web 1 as shown in Figs. 7 and 8, and each of said end sections at its opposite end has a recess 3, the same as the remaining ring sections have at both ends.

A single length of spring wire, preferably, is formed into a connecting and expanding ring member. The ends of it consist of properly bent and shaped fingers 5 to pass from the inner side of the web 1 of the end ring sections, through the openings 4 and bear at their free end portions against the outer sides of the webs.

The wire spring member is corrugated in alternate, vertically positioned U-shaped loops 6, in portions corresponding, one to each of the ring sections. At the junctions of adjacent ends of ring sections at the recesses 3 therein, the expander spring is formed with an integral holding and retaining structure as best shown in Fig. 6. One end of a corrugated portion 6 is extended in an upper horizontal length 7, at one end of a ring section, and the adjacent end of the next succeeding corrugated portion 6 is extended as a lower horizontal portion 8, below and substantially paralleling the part 7, and each is bent into a substantially semi-circular loop 9, the ends of which are joined integrally by a diagonal portion 10. This makes a pair of loops oppositely positioned, which pass through the recesses or openings at 3, at adjacent ends of successive ring sections at the loops 9 against the backs of the webs 1 of two adjacent ring sections. The corrugated portions 6 of the spring member are at the fronts of the webs 1 of the ring sections.

Such structure provides a secure connection of the ring sections to the spring member, and permits a limited relative movement longitudinally of the ring sections toward, or away, from each other at adjacent ends, so that when the ring is placed in a ring groove, as at 11 (Fig. 2) of a piston 12, and the ring is contracted within a surrounding cylinder wall, the corrugated spring member is circumferentially decreased in length and the adjacent ends of the ring sections come into substantial contact engagement with each other.

The deformation of the corrugated loops 6 in such contraction of the spring member generates a tension force, the effect of which is to tend to separate the ring sections at their ends, and enlarge the ring to a greater circumference than it has when contracted. The free edges of the flanges 2 are under a force radially pushing them outward against a cylinder wall, and, therefore, bear against a cylinder wall with the necessary pressure required for sealing and for scraping and collecting oil from the cylinder wall. The oil comes into the channels of the ring sections and may pass through the openings at the recesses 3 to the ring groove 11, and, therefrom, drain to the interior of the piston.

In Figs. 10 to 16 inclusive, instead of the sections being recessed at each end, with recesses or notches 3, each has the middle portion of its web 1 cut away to provide a rectangular opening 13 (Fig. 15). Each section is thus independently mounted upon the spring member in conjunction with the oppositely positioned loops 9. The two ends of the spring member come closely together (Fig. 14). The web of one of the ring sections has the opening 4 to receive the anchoring finger 5 at one end of the spring member, and the other end of the spring wire material from which the expanding spring is made, is shaped into a connecting structure which may pass through the center opening 13 in the web of the same ring section which terminates in an eye 14, as shown in Fig. 14, so that both end portions of the expanding spring member are securely connected to the web of one ring section.

In the modification shown in Figs. 17 to 24 inclusive, the structure is identical with that first described, except that the connecting and expanding spring member is changed in position to have the corrugated portions 6 thereof at the outer sides of the webs 1 of the ring sections and located in the channels thereof, and the section connecting loop structure passes through the recessed end portions at 3 to the inner sides of said webs. This is a reversal in position of the corrugated portions 6 and the connecting loop sections 9. Such change of position of the spring expander member does not appreciably affect or change the action of the ring in any manner. The ends of the ring member are anchored on the end ring sections, one at each side of the open parting in the ring, the fingers 5 passing from the front sides to the rear sides of the webs 1, as shown in Fig. 17.

In the last form shown in Figs. 25 to 33 inclusive, the ring sections are longer and a less number are used than in the previously described forms. In each the corrugated portions 6 of the spring expander are each formed with an intermediate outwardly extending bend 15 and two inwardly extending curved bends 16, one at each side thereof, leading to the securing and connecting loop structure by means of which the ring sections at their ends are joined with the spring member. When the ring is located within a groove 11 of a piston 12 (Fig. 26), the bends at 15 press against the inner sides of the webs 1 of the channel ring sections, substantially midway between their ends, and the inwardly extending bends at 16 are forced against the bottom of the ring groove. There is a greater outer pressure of the ring sections obtained when the ring is contracted to work within a cylinder than in the other structures, as the spring member is longer and must be contracted a greater amount than in the previous structures. But the assembly and connection of the ring sections to the spring member is the same and the substantial independence of action of the ring sections to follow irregularities which there may be in the cylinder wall adjacent the several ring sections, is attained in the same manner. In all, the circumferential decrease in length of the spring member, by straining the loops 6 of the corrugated portions of the spring member, provides the tension force which forces the ring sections to bear against a cylinder wall with an effective sealing and oil conserving action.

Having thus fully described my invention, what I desire to claim and secure by Letters Patent, is as follows:

1. A piston ring comprising, a plurality of arcuate ring sections located in alined successive end to end relation, to provide a circular ring when adjacent ends of successive sections are substantially together, each of said sections having a channel form with a vertical web and upper and lower outwardly extending horizontal flanges, and a circumferentially expansible and contractible spring member of generally circular form of spring rod material, said spring member at spaced distances in its length, generally equal to the length of a ring section, having reverse generally horizontal loops therein, and between said loops having corrugations to provide vertical loops alternately open at their upper and lower sides, said spring member being located at the inner sides of said sections, and said sections being recessed for the loops to pass therethrough and bear against the outer sides of the webs of said ring sections, said ring sections at adjacent ends being normally spaced apart and approaching each other upon circumferential contraction of the spring member.

2. A structure as defined in claim 1, said recesses in the ring section being at adjacent ends thereof, portions of the webs of the sections being removed, said spring member at the inner side of and between the opposite ends of each section having alternate inwardly and outwardly curved bowed portions, the inwardly bowed portions being adapted to bear against the bottom of a ring groove in which the ring is installed, and the outwardly bowed portions bearing against the inner sides of the webs of the ring sections.

3. A piston ring comprising, a plurality of curved successively alined ring sections adapted to provide a circular ring when adjacent ends of the sections are substantially together, and an elongated generally circular circumferentially contractible and expansible spring member located at a side of said sections, said spring member at intervals in its length, at distances from each other, in general equaling the length of a section, having radially extending connecting means and said sections having openings through which said connecting means pass, the openings being of less dimension in one direction than the connecting means for mounting said ring sections upon and connecting them with the spring member, said ring sections being normally separable at adjacent ends when mounted on and connected to the spring member, and approaching each other at adjacent ends on circumferential contraction of said spring member, said spring member between said radially extending connecting means, having vertical corrugations alternately open at upper and lower sides for ready circumferential expansion and contraction of the spring member.

4. A piston ring comprising a plurality of curved successively alined ring sections adapted to provide a circular ring when adjacent ends of the sections are substantially together, and an elongated generally circular circumferentially contractible and expansible spring member located at a side of said sections, said spring member at intervals in its length, at distances from each other, in general equaling the length of a section, having radially extending connecting means and said sections having openings through which said connecting means pass, the openings being of less dimension in one direction than the connecting means for mounting said ring sections upon and connecting them with the spring member, said ring sections being normally separable at adjacent ends when mounted on and connected to the spring member, and approaching each other at adjacent ends on circumferential contraction of said spring member, each of said sections being of channel form having a vertical web and outwardly extending upper and lower flanges, each of said webs between its ends having an opening therethrough, through which openings the spaced connecting means on the spring member extend and engage against the opposite side of the webs of said ring sections at opposite sides of the recess, and means for anchoring the end of the spring member on one of said sections.

THURLOW E. McFALL.

REFERENCES CITED

The following references are of record in the file of this patent:

UNITED STATES PATENTS

| Number | Name | Date |
|---|---|---|
| 1,918,707 | Mellor | July 18, 1933 |
| 2,346,897 | Bowers | Apr. 18, 1944 |
| 2,355,772 | Zahodiakin | Aug. 15, 1944 |
| 2,439,546 | McFall | Apr. 13, 1948 |
| 2,466,252 | McFall | Apr. 5, 1949 |
| 2,466,253 | McFall | Apr. 5, 1949 |